(No Model.)
C. D. GOODMAN & F. J. SMITH.
MILKING STOOL.
No. 297,786. Patented Apr. 29, 1884.
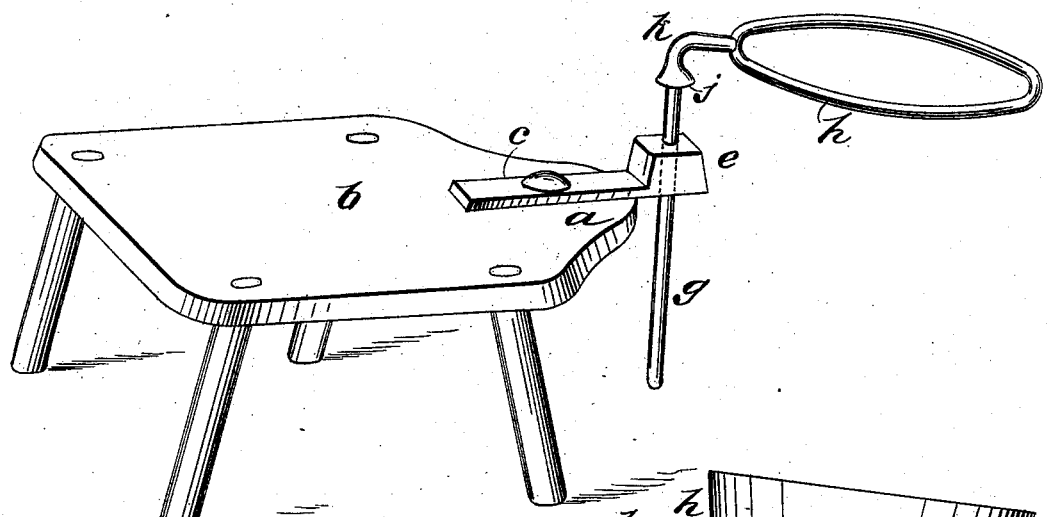
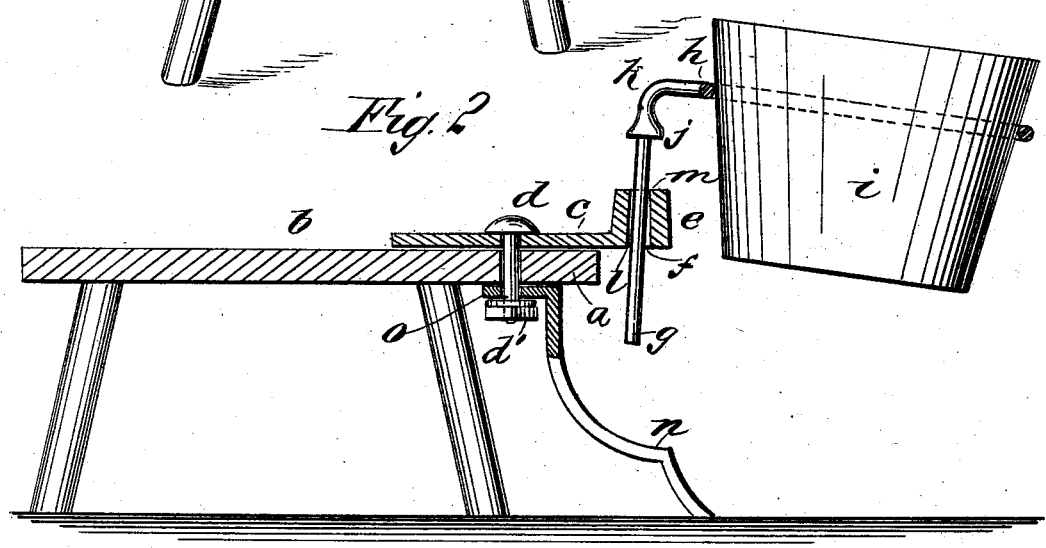
WITNESSES:
INVENTOR:

UNITED STATES PATENT OFFICE.

CZAR D. GOODMAN AND FREDERICK J. SMITH, OF GRANBY, CONNECTICUT.

MILKING-STOOL.

SPECIFICATION forming part of Letters Patent No. 297,786, dated April 29, 1884.

Application filed November 28, 1883. (No model.)

*To all whom it may concern:*

Be it known that we, CZAR D. GOODMAN and FREDERICK J. SMITH, both of Granby, in the county of Hartford and State of Connecticut, have invented a new and Improved Milking-Stool, of which the following is a full, clear, and exact description.

Our invention consists of an improved milk-pail-holding attachment to milking-stools, contrived for ready and convenient adjustment to suit the conditions and requirements of all kinds in practical use, and to enable the pail to be readily lifted off the holder for emptying and replacing it without connecting or disconnecting any fastening devices; and the invention also comprises a strut attachment that may be used or not to prevent the stool from upsetting in case the milker should rise from the stool when the pail is loaded with milk, all as hereinafter fully described.

Reference is to be had to the accompanying drawings, forming part of this specification, in which similar letters of reference indicate corresponding parts in all the figures.

Figure 1 is a perspective view of a milking-stool with our improved pail-holding attachment; and Fig. 2 is a sectional elevation of the stool and the pail-holding attachment and strut, and a side elevation of the pail.

We make a little point-extension, $a$, of one end of the stool-seat $b$, and fit thereon a flat or other suitable bar $c$, which we fasten substantially by a bolt, $d$, and nut $d'$, and so that the bar can project beyond the point $a$ in the center line of the stool-seat, or be swung on the bolt either way, as may be required, and we provide the outer end of this bar $c$ with a socketed head, $e$, through which the socket-hole $f$ is arranged vertically for the reception of the vertical pivot-stem $g$ of a horizontal ring, $h$, projecting forward from the upper end of the said stem suitably for holding the milk-pail $i$ sufficiently in advance of the stool-seat to be suspended under the udder of the cow for receiving the milk therefrom. The stem $g$ has a collar, $j$, a little below the bend $k$, to limit the fall of the stem through the socket-head $e$ to about the lowest position the pail may require to be placed in, and the bend $k$ is turned to a little less than a right angle, to cause the top of the pail to pitch forward and incline downward from the milker, as is preferred for the most convenient position for the milker. The hole $f$ through the socket-head $e$ of the bar $c$ is to be a little larger than the stem $g$, so that the stem will bear against the lower angle at $l$ and the upper angle at $m$ by the gravity of the overhanging pail with sufficient friction to bind the stem by these angles, so that it will be held at any height for holding the pail high or low without a set-screw; but a set-screw may be used, if preferred.

Together with this improved milk-pail attachment we propose to employ a strut or brace, $n$, to reach forward from the under side of the front end, $a$, of the stool-seat $b$, and rest on the ground under the pail, or nearly so, to resist the tendency of the pail to upset the stool by its overhanging weight. We prefer to connect this strut to the stool-seat by the same bolt $d$ and nut $d'$ that the bar $c$ is connected with, the strut being made with an angle-head, $o$, to be bolted up against the under side of the stool-seat by the bolt which passes through said angle-head. The strut may thus be turned either way to rest directly under the pail when the pail-holder is shifted either way on the stool. The strut may, however, be attached to the stool by any other approved method, and it may be attached without provision for shifting.

The pail-holder may be used with or without this strut attachment. It will be seen that the pail may be readily lifted off the stool by raising the stem $g$ out of the socket $f$ when the pail is to be emptied, and it may be as readily replaced without having to manipulate any fastening devices, as a set-screw, or the like; or the pail may be lifted from the ring by its bail without lifting the stem $g$ from its socket, and the collar $j$ may be dispensed with, and the bend $k$ then serve to limit the downward movement of the ring-stem and the pail.

Having thus described our invention, we claim as new and desire to secure by Letters Patent—

1. The combination of the pail-holding attachment consisting of the plate $c$, having a socket-head, $e$, and being suitably attached to the stool-seat, and the pail-ring $h$, having a pivot-stem, g, integral therewith, fitting the socket of head c, with a milking-stool, b, substantially as described.

2. The combination of the bar c, provided with a socket, f, with the stem g, and a pail-holding ring, h, formed integral therewith, the said socket being of a greater diameter than the stem, whereby the stem and its ring will be held at any desired height by the friction of the stem on the opposite edges, l m, of the socket, substantially as set forth.

3. A milking-stool provided with a pail-holding attachment, in combination with the strut n, bent outward beyond the end of the stool, as shown, and provided at its upper end with a securing-flange, by which it may be secured to the stool, substantially as set forth.

4. The strut n, attached to the stool b by the angle-head o, bolt d, and nut d', in combination with the pail-holding attachment, also attached to the stool by the said bolt d and nut d', substantially as described.

CZAR D. GOODMAN.
FREDERICK J. SMITH.

Witnesses:
T. M. MALTBIE,
P. S. BRYANT.